US012410859B2

(12) United States Patent
Kapellusch et al.

(10) Patent No.: US 12,410,859 B2
(45) Date of Patent: Sep. 9, 2025

(54) TRANSMISSION BREATHER SYSTEM

(71) Applicant: Harley-Davidson Motor Company, Inc., Milwaukee, WI (US)

(72) Inventors: Samuel Kapellusch, Milwaukee, WI (US); Christopher Monaco, Milwaukee, WI (US); Daniel Sepic, Milwaukee, WI (US); Anthony Coffey, Milwaukee, WI (US); Peter Chiappetta, Milwaukee, WI (US); Liam Maslovich, Milwaukee, WI (US); Christina Exner, Milwaukee, WI (US)

(73) Assignee: HARLEY-DAVIDSON MOTOR COMPANY, INC., Milwaukee, WI (US)

( * ) Notice: Subject to any disclaimer, the term of this patent is extended or adjusted under 35 U.S.C. 154(b) by 167 days.

(21) Appl. No.: 18/352,691

(22) Filed: Jul. 14, 2023

(65) Prior Publication Data

US 2024/0360898 A1    Oct. 31, 2024

Related U.S. Application Data

(60) Provisional application No. 63/498,196, filed on Apr. 25, 2023.

(51) Int. Cl.
*F16H 57/02* (2012.01)
*F16H 57/027* (2012.01)

(52) U.S. Cl.
CPC ........ *F16H 57/027* (2013.01); *B60Y 2200/12* (2013.01)

(58) Field of Classification Search
CPC .... F16H 57/027; F01M 13/04; B60Y 2200/12
See application file for complete search history.

(56) References Cited

U.S. PATENT DOCUMENTS

| 4,844,032 | A | * | 7/1989 | Groeger | F01M 13/0416 |
| | | | | | 123/196 R |
| 5,474,035 | A | * | 12/1995 | Ming | F01M 13/0416 |
| | | | | | 123/90.38 |
| 9,546,579 | B2 | * | 1/2017 | Isechi | F16H 57/027 |
| 11,920,670 | B2 | * | 3/2024 | Trask | F16H 57/031 |

(Continued)

FOREIGN PATENT DOCUMENTS

| DE | 102005048952 B4 * | 4/2010 | ........ F01M 13/023 |
| DE | 102018209278 A1 | 12/2019 | |

(Continued)

OTHER PUBLICATIONS

Machine translation of JP 2008-157193 A obtained on Feb. 25, 2025.*

(Continued)

*Primary Examiner* — Adam D Rogers
(74) *Attorney, Agent, or Firm* — Jordan IP Law, LLC

(57) ABSTRACT

A motorcycle with a single transmission breather that is mounted over the transmission case. Crank case gas passes through the breather. Oil separated from the breather drains back to a cavity under the breather. Gases separated in the breather travel through a breather hose to an airbox. The breather utilizes a sloped incline in order to prevent oil that separates out from pooling.

19 Claims, 18 Drawing Sheets

(56) References Cited

U.S. PATENT DOCUMENTS

| | | | |
|---|---|---|---|
| 2007/0000729 A1* | 1/2007 | Lund | F16H 57/027 |
| | | | 184/6.23 |
| 2015/0114327 A1 | 4/2015 | Isechi | |
| 2024/0175485 A1* | 5/2024 | Trask | F01M 13/0011 |

FOREIGN PATENT DOCUMENTS

| | | | | |
|---|---|---|---|---|
| DE | 102016205678 B4 * | 9/2021 | | B60T 17/02 |
| JP | 10-169760 A * | 6/1998 | | |
| JP | 2008157193 A * | 7/2008 | | F01M 13/04 |

OTHER PUBLICATIONS

Machine translation of JP 10-169760 A obtained on Feb. 25, 2025.*
German Patent and Trademark Office, Office Action for DE102023118968.9. dated Nov. 20, 2024.

* cited by examiner

TRANSMISSION BREATHER SYSTEM

CROSS REFERENCE TO RELATED APPLICATIONS

This application claims benefit to U.S. provisional application 63/498,196 filed Apr. 25, 2023, which is incorporated by reference herein in its entirety.

TECHNICAL FIELD

One or more embodiments relate generally to a transmission breather system for a motorcycle that uses an internal combustion engine.

BACKGROUND

In prior art motorcycles, transmission breathers are used to vent crankcase pressures. These crankcase gases contain oil mist, water vapor, and unburned fuel. The breather system separates the liquids so that the crankcase gases can be introduced into the combustion system. Two breathers can be used for the same motorcycle, one mounted above the heads (front and rear) under rocker covers.

BRIEF SUMMARY

In accordance with one or more embodiments, an example motorcycle is provided that comprises a transmission case; and a breather assembly mounted on the transmission case.

In accordance with one or more embodiments, an example motorcycle is provided that comprises a transmission case; and a breather assembly mounted over the transmission case.

In accordance with the example motorcycle, the breather assembly is the only breather on the motorcycle.

In accordance with the example motorcycle, a plurality of fasteners fastening the breather assembly to the transmission case.

In accordance with the example motorcycle, the breather assembly further comprises: a drain; and a sloped floor connected to the drain.

In accordance with the example motorcycle, the breather assembly further comprises a base, In accordance with the example motorcycle, the sloped floor makes an angle with the base of 17 degrees.

In accordance with the example motorcycle, the sloped floor makes an angle with the base in a range of 10 to 30 degrees.

In accordance with the example motorcycle, further comprises a drain; and an umbrella valve attached to the drain.

In accordance with one or more embodiments, an apparatus, comprises: a breather assembly that comprises an outlet on a top of the breather assembly; an inlet on a bottom of the breather assembly; a drain on the bottom of the breather assembly; and a sloped floor leading to the drain.

In accordance with the example apparatus, the breather assembly is configured to separate out oil, water vapor, and fuel from the mixture entering the inlet.

In accordance with the example apparatus, the apparatus further comprises a motorcycle attached to the breather assembly.

In accordance with the example apparatus, the breather assembly is the only breather attached to the motorcycle.

In accordance with the example apparatus, the breather assembly is mounted on a transmission case attached to the motorcycle.

In accordance with the example apparatus, the apparatus further comprises an umbrella valve attached to the drain.

In accordance with the example apparatus, the apparatus further comprises a second passage connecting the inlet to an oil reservoir.

In accordance with the example apparatus, the apparatus further comprises a first passage connecting the inlet to a cam chest.

In accordance with one or more embodiments, a motorcycle comprises a transmission; and a breather assembly mounted over the transmission.

In accordance with the example apparatus, the motorcycle has no other breather other than the breather assembly.

In accordance with the example apparatus, the breather assembly further comprises a sloped floor.

In accordance with the example apparatus, the breather assembly further comprises a drain connected to the sloped floor.

BRIEF DESCRIPTION OF THE SEVERAL VIEWS OF THE DRAWINGS

The various advantages of the exemplary embodiments will become apparent to one skilled in the art by reading the following specification and appended claims, and by referencing the following drawings, in which:

DETAILED DESCRIPTION

In accordance with one or more embodiments set forth, shown, and described herein, a transmission breather assembly is mounted on the transmission case of a motorcycle. A breather for a motorcycle serves to manage the pressure inside a crank case. The breather system will act to separate out liquids such as oil, water, or unburned fuel prior to circulating the breather gases to the airbox. The motorcycle which uses the breather assembly and embodiments described herein is the kind that uses gasoline as fuel.

Figure 1:
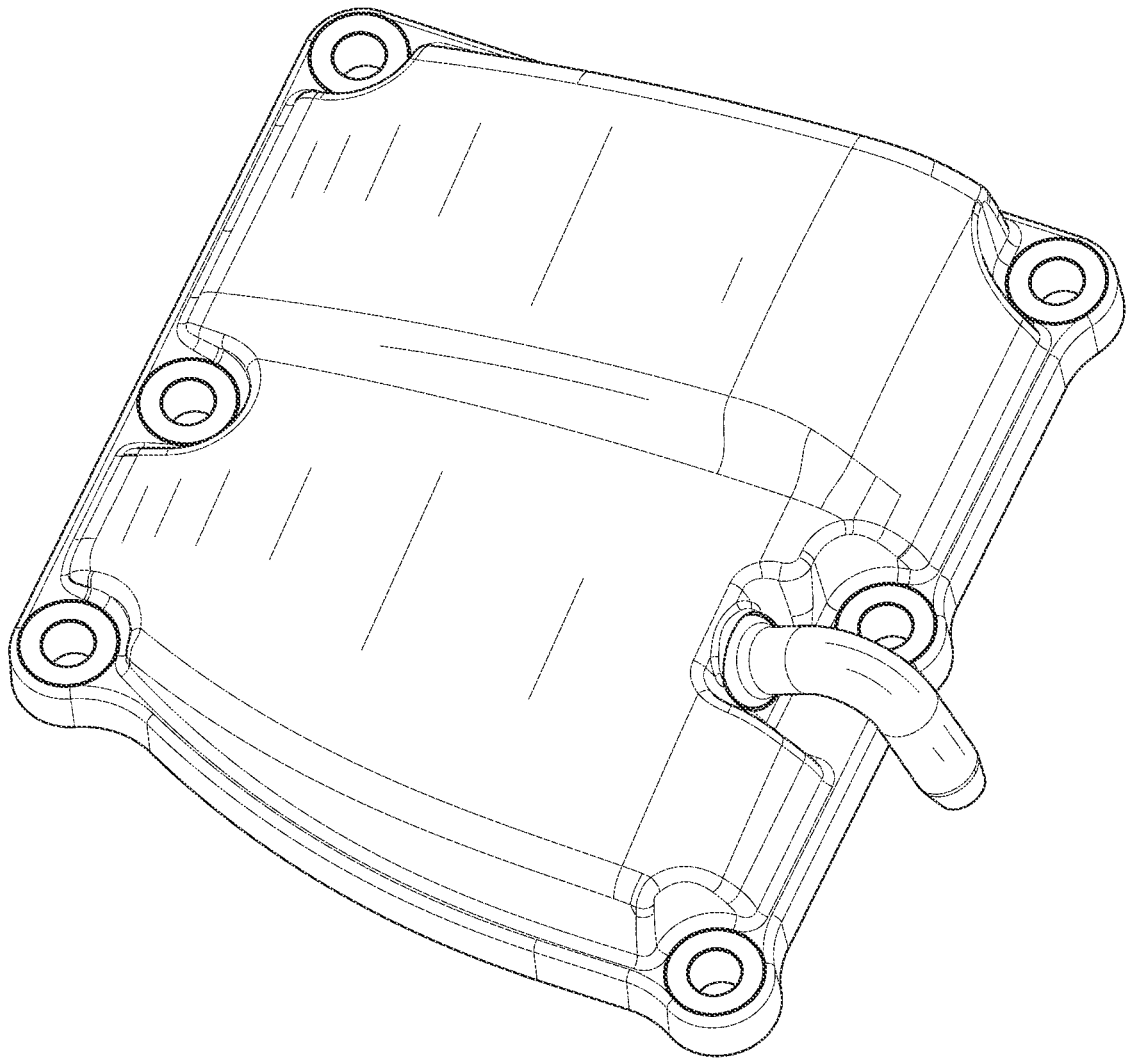
FIG. 1 illustrates a related art transmission cover.

A single breather can be used instead of multiple breathers. FIG. 1 illustrates a related art transmission cover over a transmission case. This cover is no longer needed, and the breather assembly can be mounted above the transmission. In accordance with one or more embodiments set forth, shown, and described herein, the breather assembly can be mounted above the transmission case. In accordance with one or more embodiments set forth, shown, and described herein, the breather assembly can be mounted over the transmission case in place of a transmission cover. In accordance with one or more embodiments set forth, shown, and described herein, a rear cylinder of the motorcycle will be in front of the breather assembly.

Figure 2:
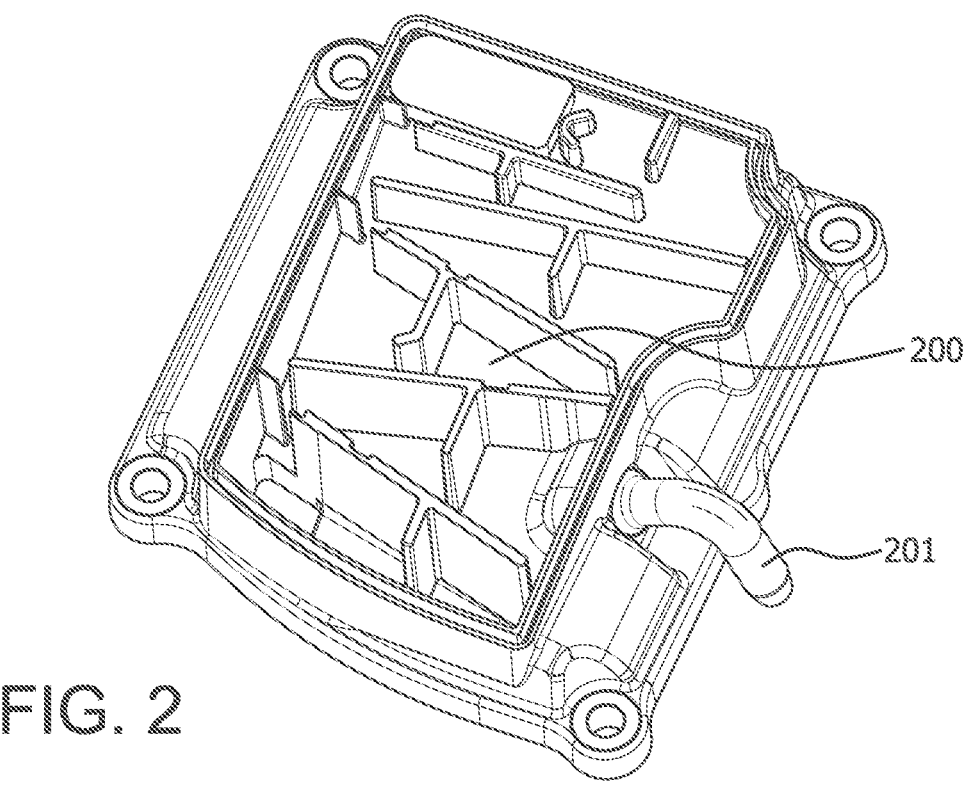
FIG. 2 illustrates an example inside view showing a labyrinth of a breather assembly, in accordance with one or more embodiments set forth, shown, and described herein.

As illustrated in FIG. 2, an example inside view of a labyrinth of a breather assembly is shown, in accordance with one or more embodiments set forth, shown, and described herein. The breather shown has a vent hose 201 which is not part of the breather circuit. A labyrinth 200 is used to separate out oil.

Figure 3:
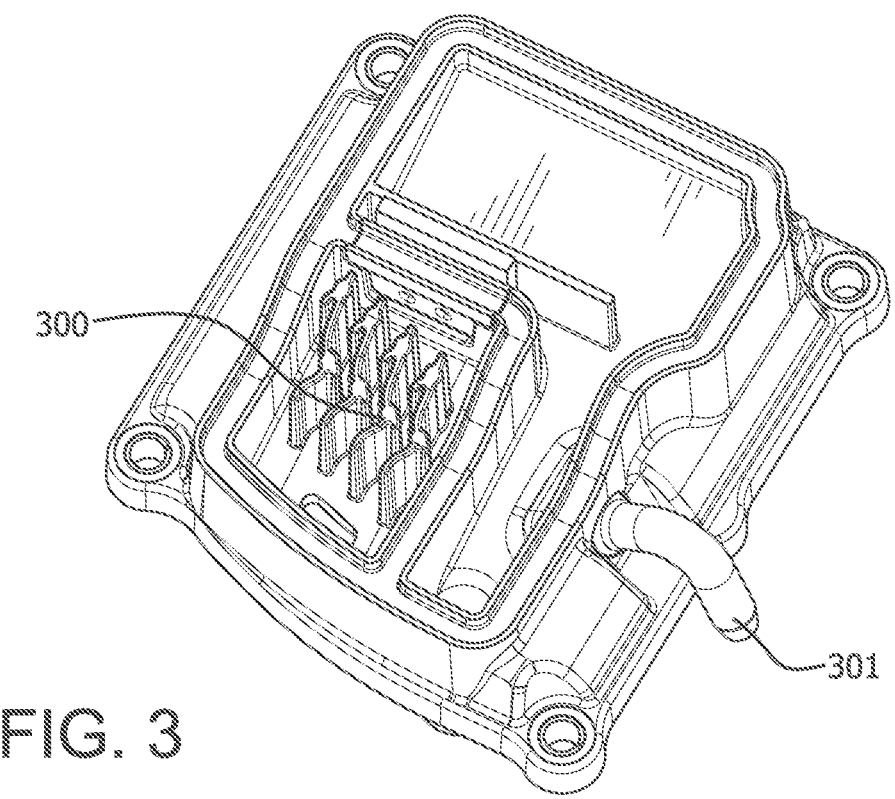
FIG. 3 illustrates a further example inside view showing a labyrinth of a breather assembly, in accordance with one or more embodiments set forth, shown, and described herein.

As illustrated in FIG. 3, a further example inside view a labyrinth of a breather assembly is shown, in accordance with one or more embodiments set forth, shown, and described herein. The breather assembly shown has a vent hose 301 which is not part of the breather circuit. A labyrinth 300 is used to separate out oil.

Figure 4:
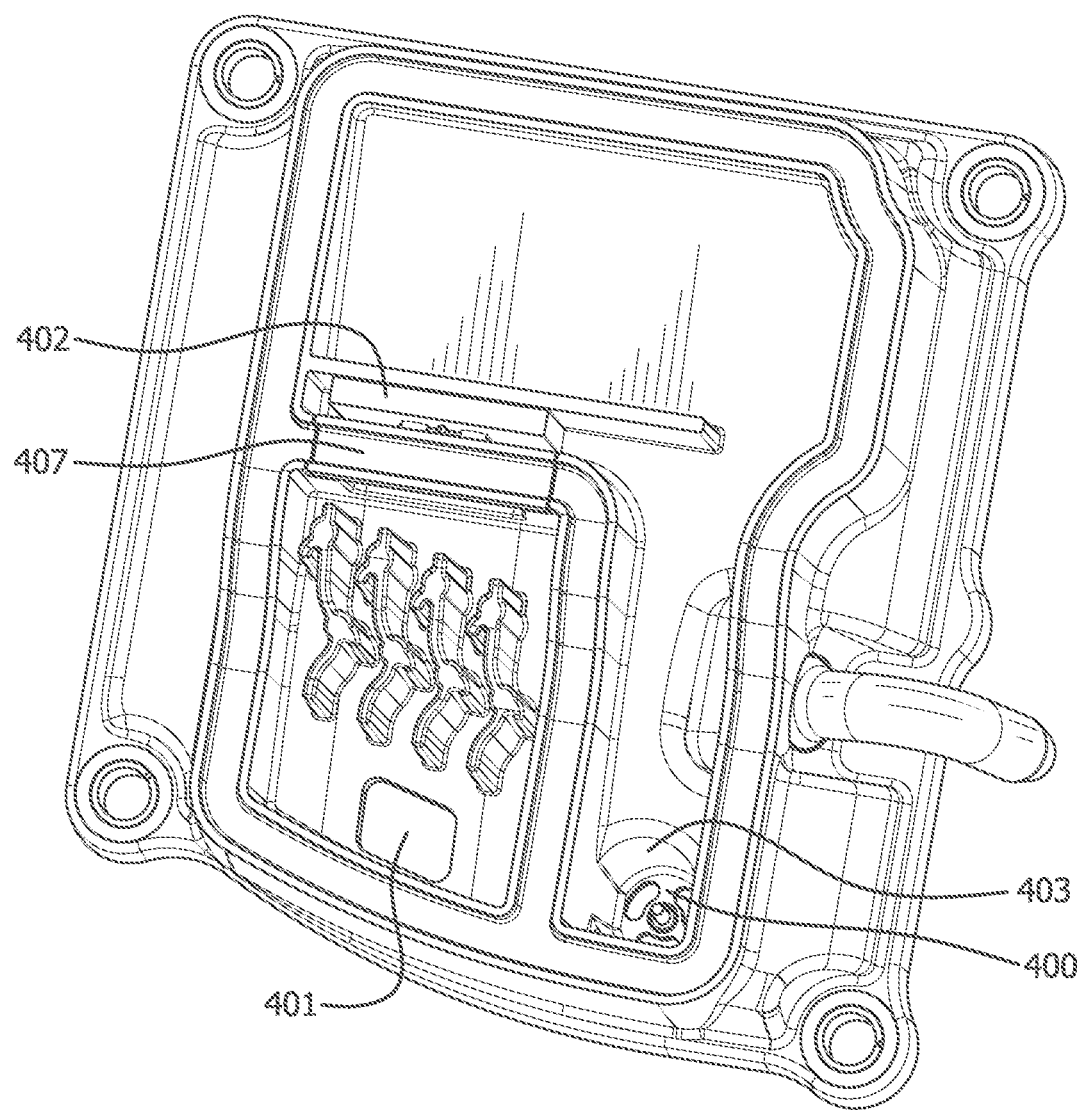
FIG. 4 illustrates a top inside view showing a breather assembly, in accordance with one or more embodiments set forth, shown, and described herein.

As illustrated in FIG. 4, a top inside view of a breather assembly is shown, in accordance with one or more embodiments set forth, shown, and described herein.

A breather media 402 (such as a filter which can be made out of any suitable material, such as foam, stainless steel mesh, fleece, etc.) and impactor plate 407 (which can be made out of any suitable material, such as metal or plastic and has holes in it) are used to separate oil from the vapors. A breather inlet 401 is where vapors enter the breather assembly. A drain 403 is where the oil separated from the vapor can exit the breather assembly. The drain 403 can have a valve such as an umbrella valve 400.

Figure 5:
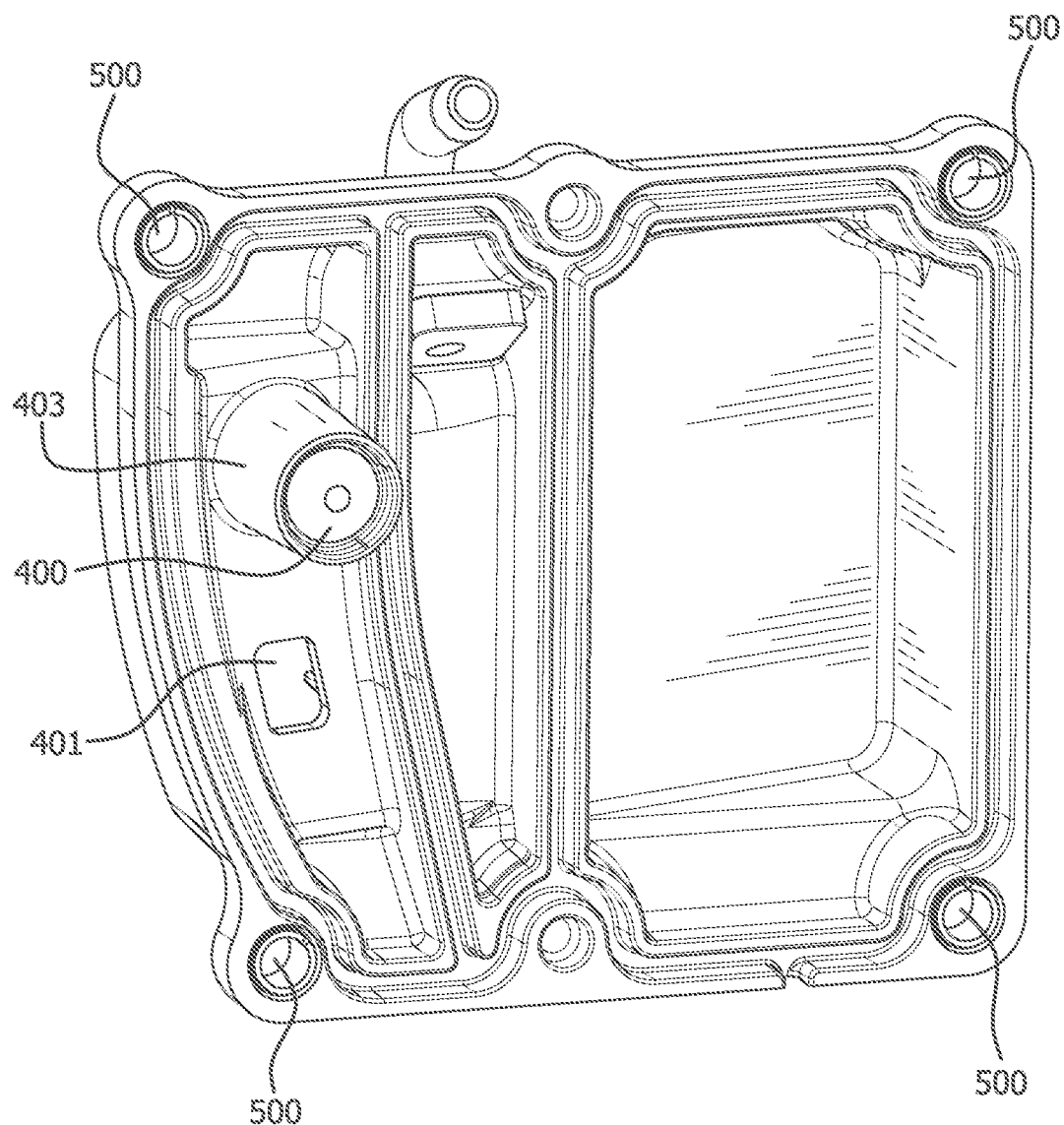
FIG. 5 illustrates a bottom view showing the breather assembly of FIG. 4, in accordance with one or more embodiments set forth, shown, and described herein.

As illustrated in FIG. 5, a bottom view of the breather assembly of FIG. 4 is shown, in accordance with one or more embodiments set forth, shown, and described herein. Shown is the drain 403, umbrella valve 400, and inlet 401. There are four holes 500 adapted to receive a fastener (not shown in FIG. 5) which is how the breather assembly will be mounted on a transmission case.

Figure 6:
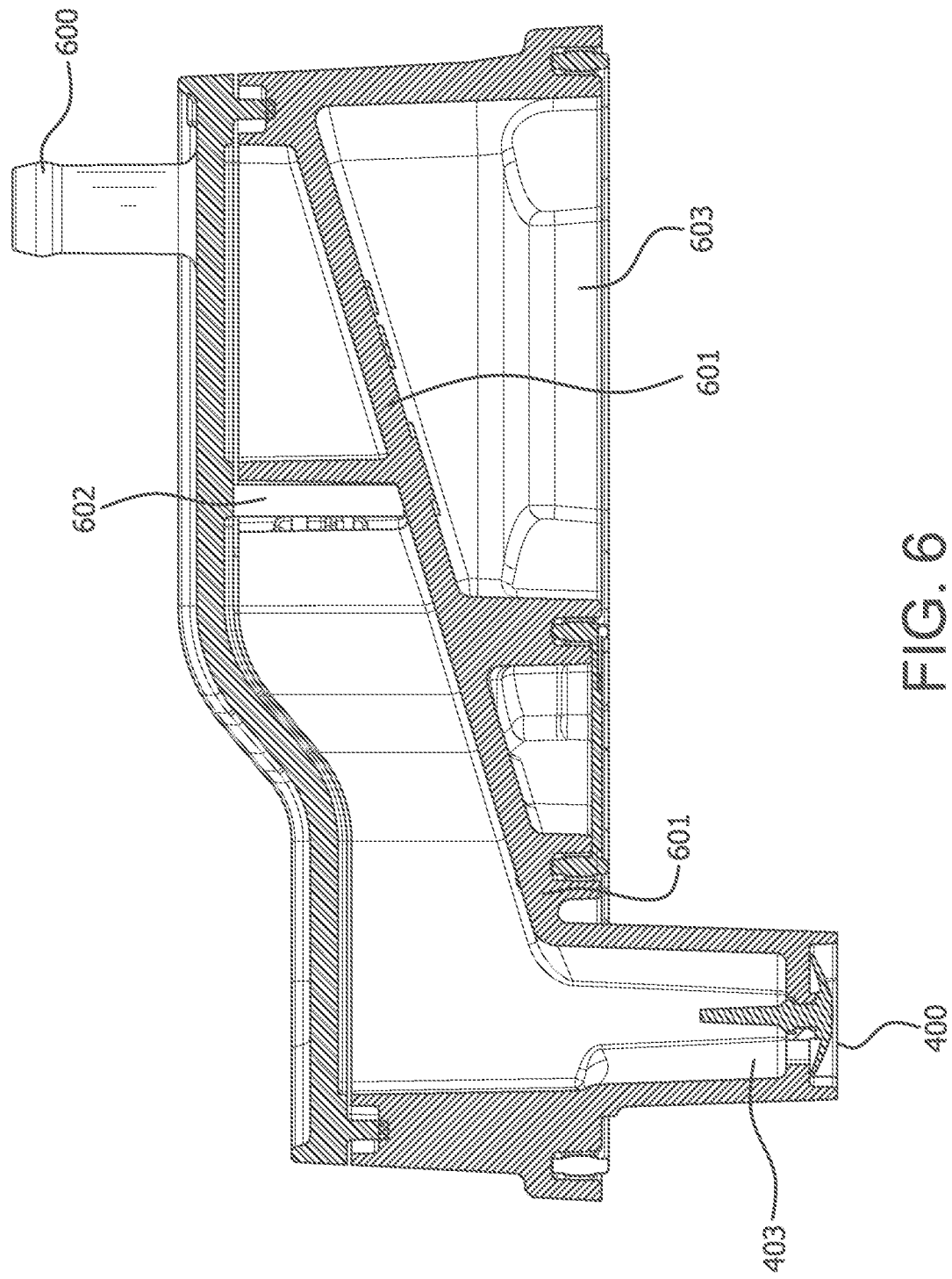
FIG. 6 illustrates a side internal view showing the breather assembly of FIG. 4, in accordance with one or more embodiments set forth, shown, and described herein.

As illustrated in FIG. 6, a side internal view of the breather assembly of FIG. 4 is shown, in accordance with one or more embodiments set forth, shown, and described herein. Shown is the breather media 602, drain 403, umbrella valve 400, outlet 600. Also shown is the base 603 of the breather assembly. A floor 601 is used to help prevent oil that separated from the vapor from pooling, as the separated oil will fall down the incline. The incline can be a 17 degree slope (relative to the base 603), although other angles can be used as well (e.g., 10 to 30 degrees, or other range). The oil that separates from the vapor will fall down the sloped floor 601 due to gravity and exit out the drain 403. This slope helps prevent the oil from pooling. The outlet 600 can lead directly to the outside, or it can be attached to a hose that will lead to the outside, or alternatively the outlet can be connected to hose that can recirculate the air coming out of the outlet.

Figure 7:
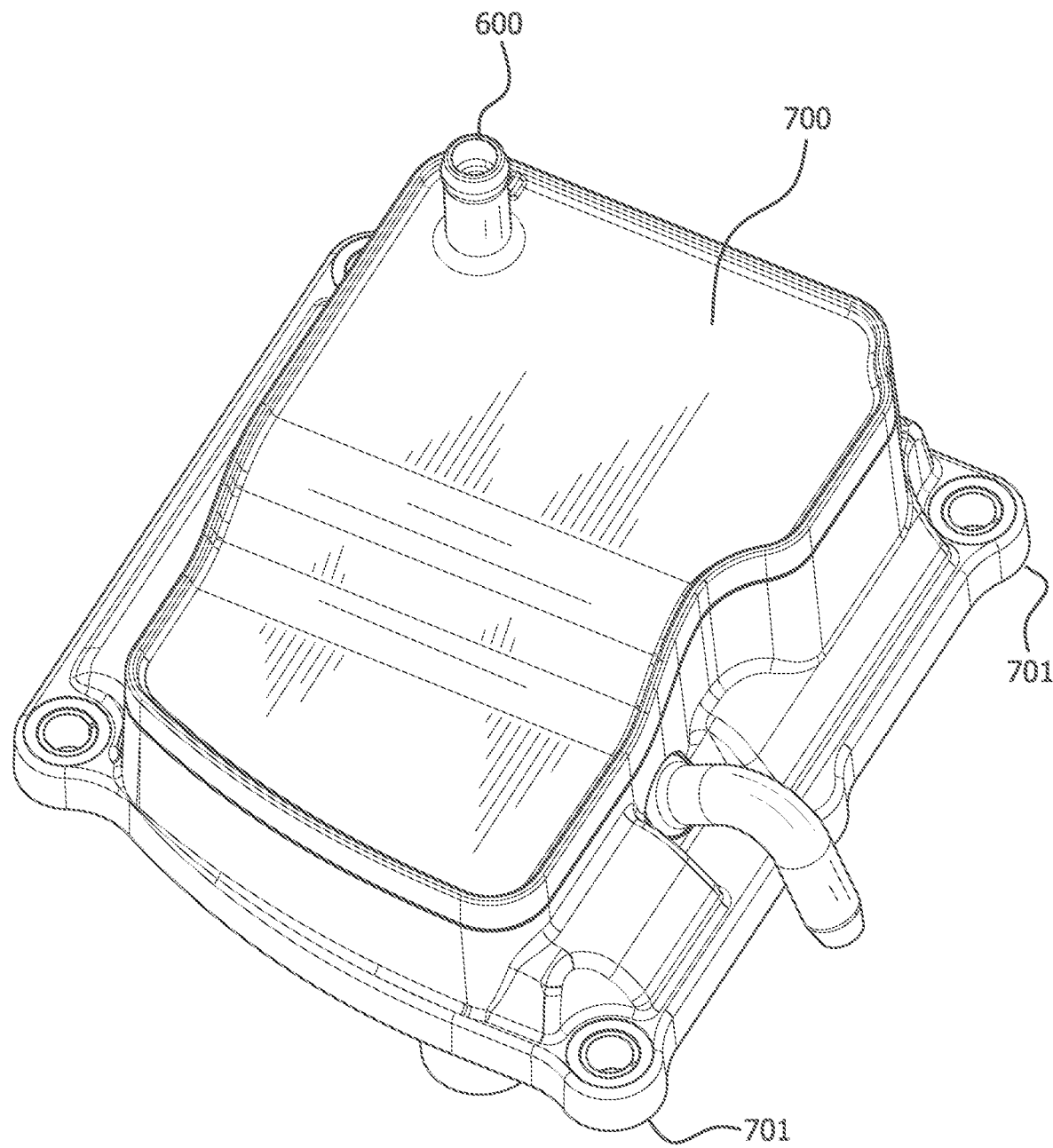
FIG. 7 illustrates a top view showing a cover on the breather assembly of FIG. 4, in accordance with one or more embodiments set forth, shown, and described herein.

FIG. 7 illustrates a top view showing a cover on the breather assembly of FIG. 4, in accordance with one or more embodiments set forth, shown, and described herein. A breather cover 700 covers the top of the breather assembly 701. The outlet 600 passes through the breather cover 700. The breather assembly 701 can have any combination of any of the structures described and illustrated herein.

Figure 8:
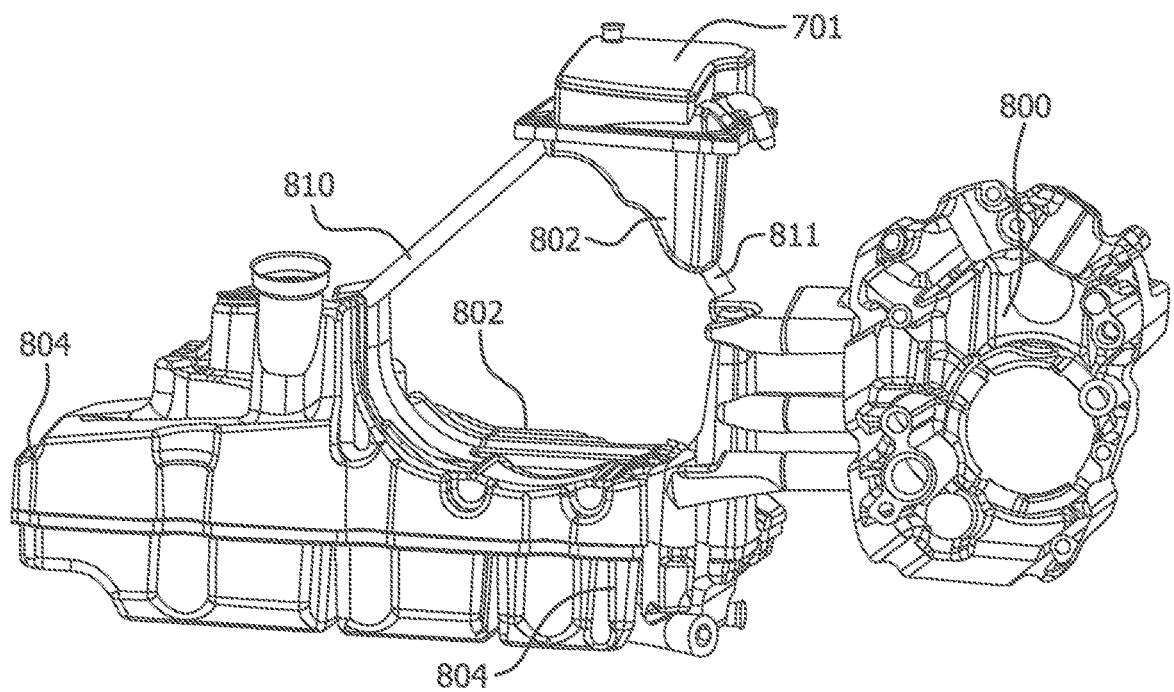
FIG. 8 illustrates a view of the breather assembly and surrounding apparatus, in accordance with one or more embodiments set forth, shown, and described herein.

As illustrated in FIG. 8, a view of the breather assembly and surrounding apparatus is shown, in accordance with one or more embodiments set forth, shown, and described herein. The motorcycle comprises cam chest area 800, transmission contents 802 (where the transmission is located), and oil reservoir 804. As shown in FIG. 8, the breather assembly is mounted over the transmission contents 802 and over the oil reservoir 804. Second passage 810 is a communication channel between the breather assembly and the oil reservoir 804 and feeds the breather assembly through the inlet 401. First passage 811 is a communication channel between the breather assembly and the cam chest area 800 and feeds the breather assembly through the inlet 401. Drained oil falling out of the drain 403 can pass down through the first passage 811.

Figure 9:
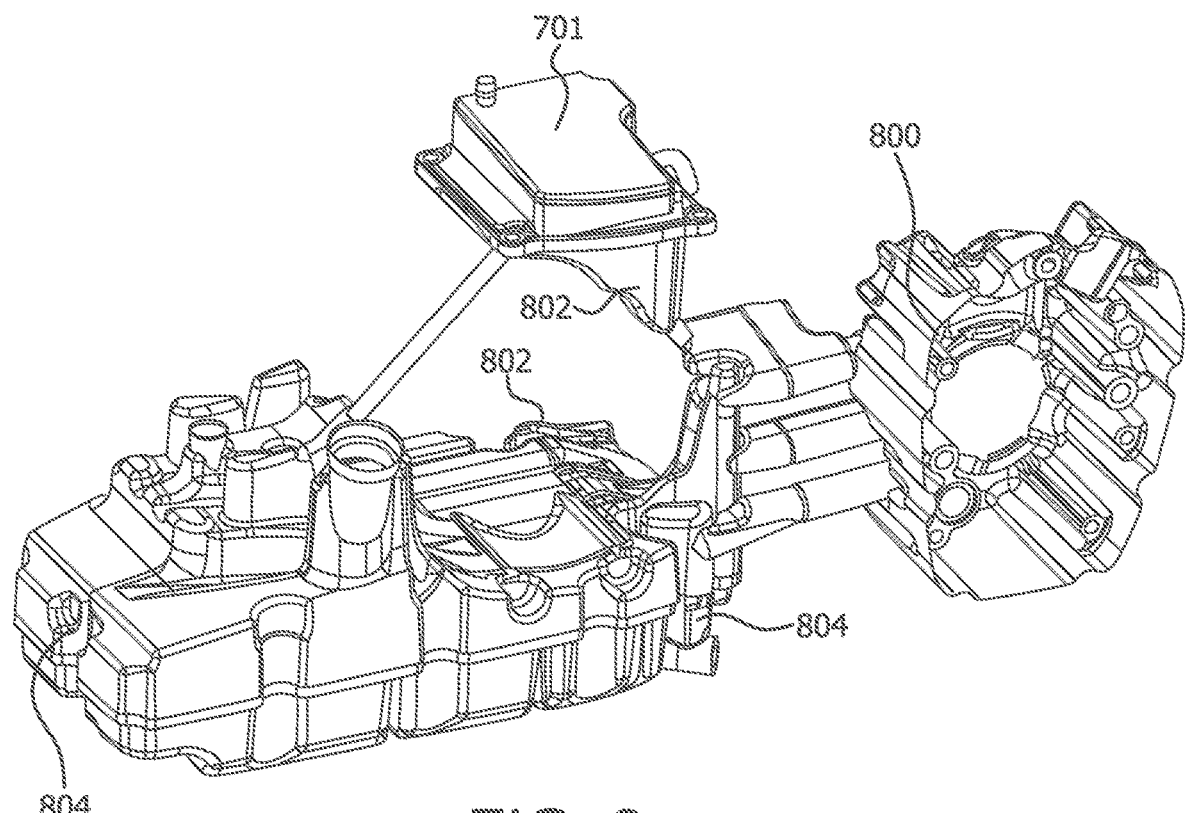
FIG. 9 illustrates a diagonal view of the breather assembly and the surrounding apparatus, in accordance with one or more embodiments set forth, shown, and described herein.

As illustrated in FIG. 9, a diagonal view of the breather assembly and the surrounding apparatus is shown, in accordance with one or more embodiments set forth, shown, and described herein.

Figure 10:
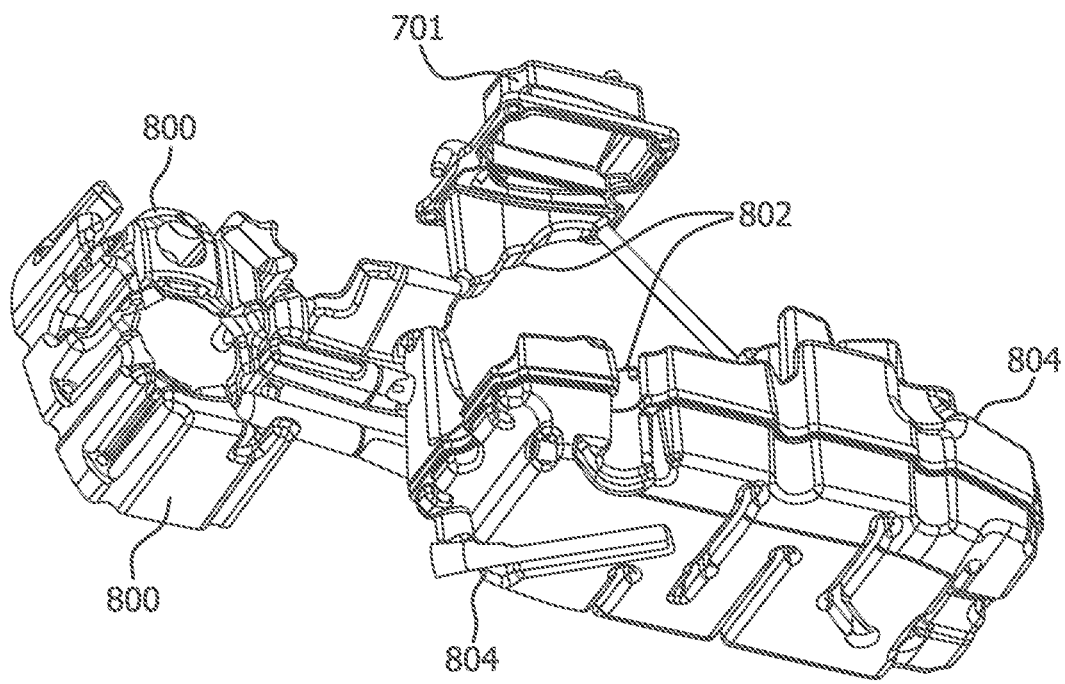
FIG. 10 illustrates an underside view of the breather assembly and the surrounding apparatus, in accordance with one or more embodiments set forth, shown, and described herein.

As illustrated in FIG. 10, an underside view of the breather assembly and the surrounding apparatus is shown, in accordance with one or more embodiments set forth, shown, and described herein.

Figure 11:
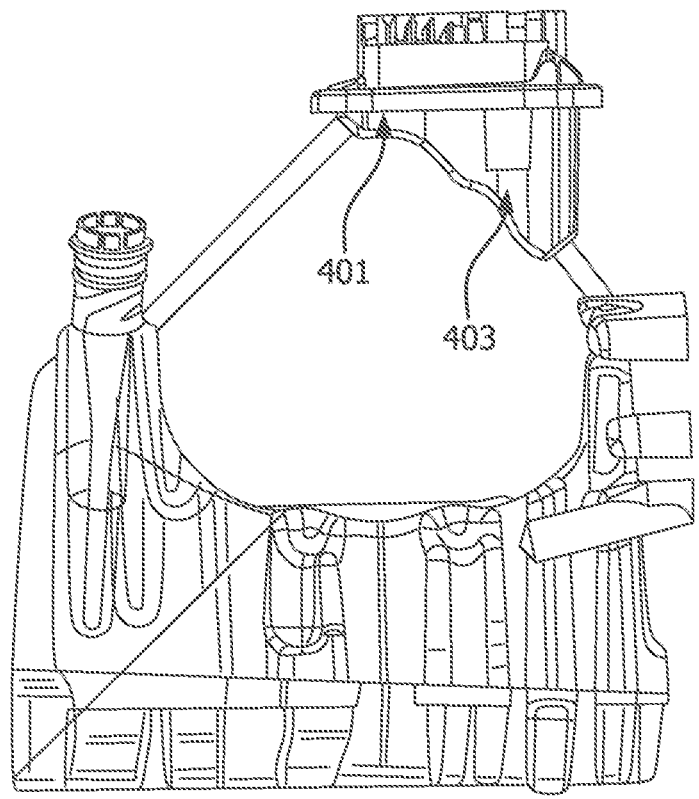
FIG. 11 illustrates a bottom of the breather assembly including the inlet and drain with surrounding components transparent, in accordance with one or more embodiments set forth, shown, and described herein.

FIG. 11 illustrates a bottom of the breather assembly including the inlet and drain with surrounding components transparent, in accordance with one or more embodiments set forth, shown, and described herein. Inlet 401 is identified and drain 403 is shown. In accordance with one or more embodiments set forth, shown, and described herein, the drain 403 can be connected to the first passage 811.

Figure 12:
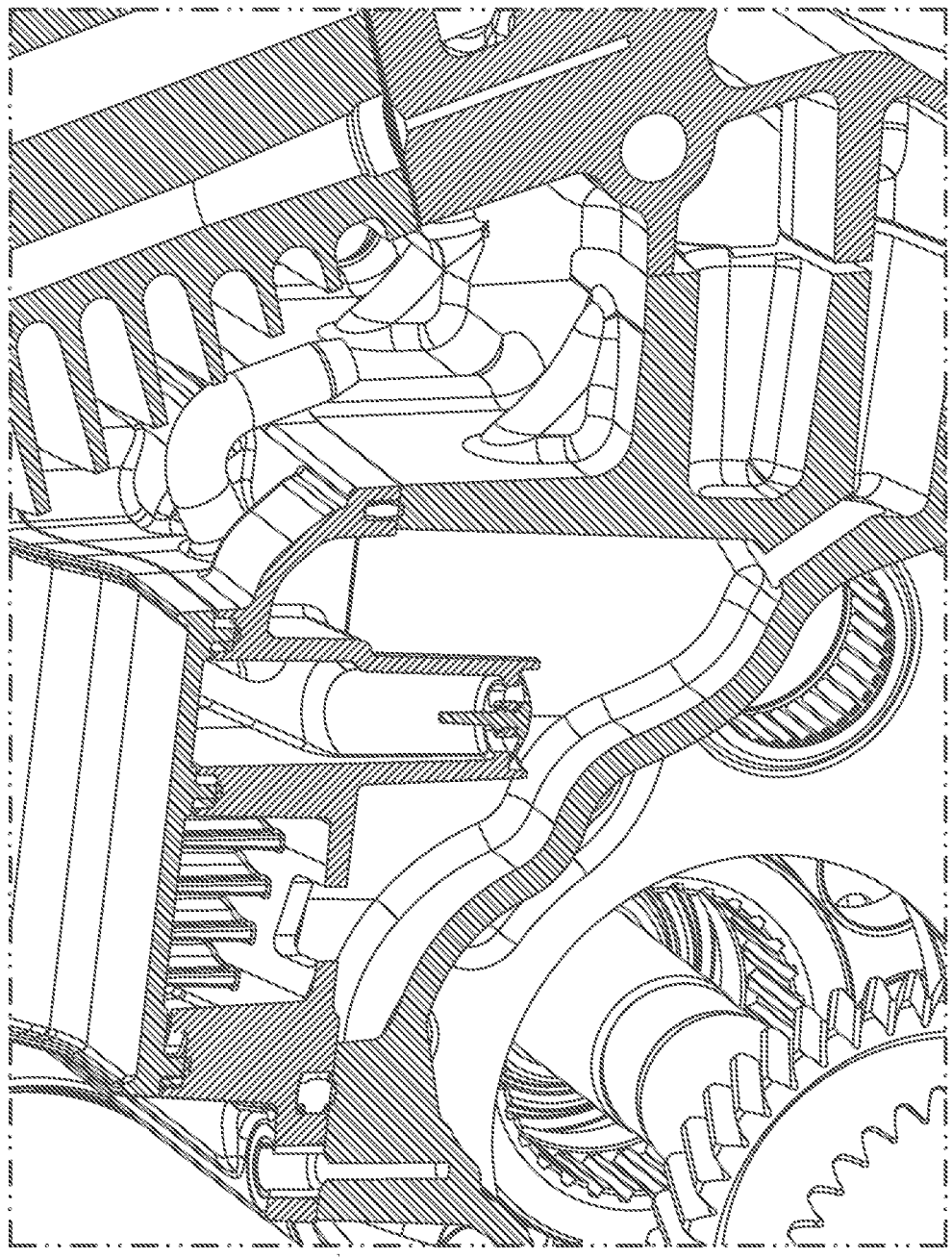
FIG. 12 illustrates a cross section showing the breather inlet and drain tunnel, in accordance with one or more embodiments set forth, shown, and described herein.

As illustrated in FIG. 12, a cross section showing the breather inlet and drain tunnel is shown, in accordance with one or more embodiments set forth, shown, and described herein.

Figure 13:
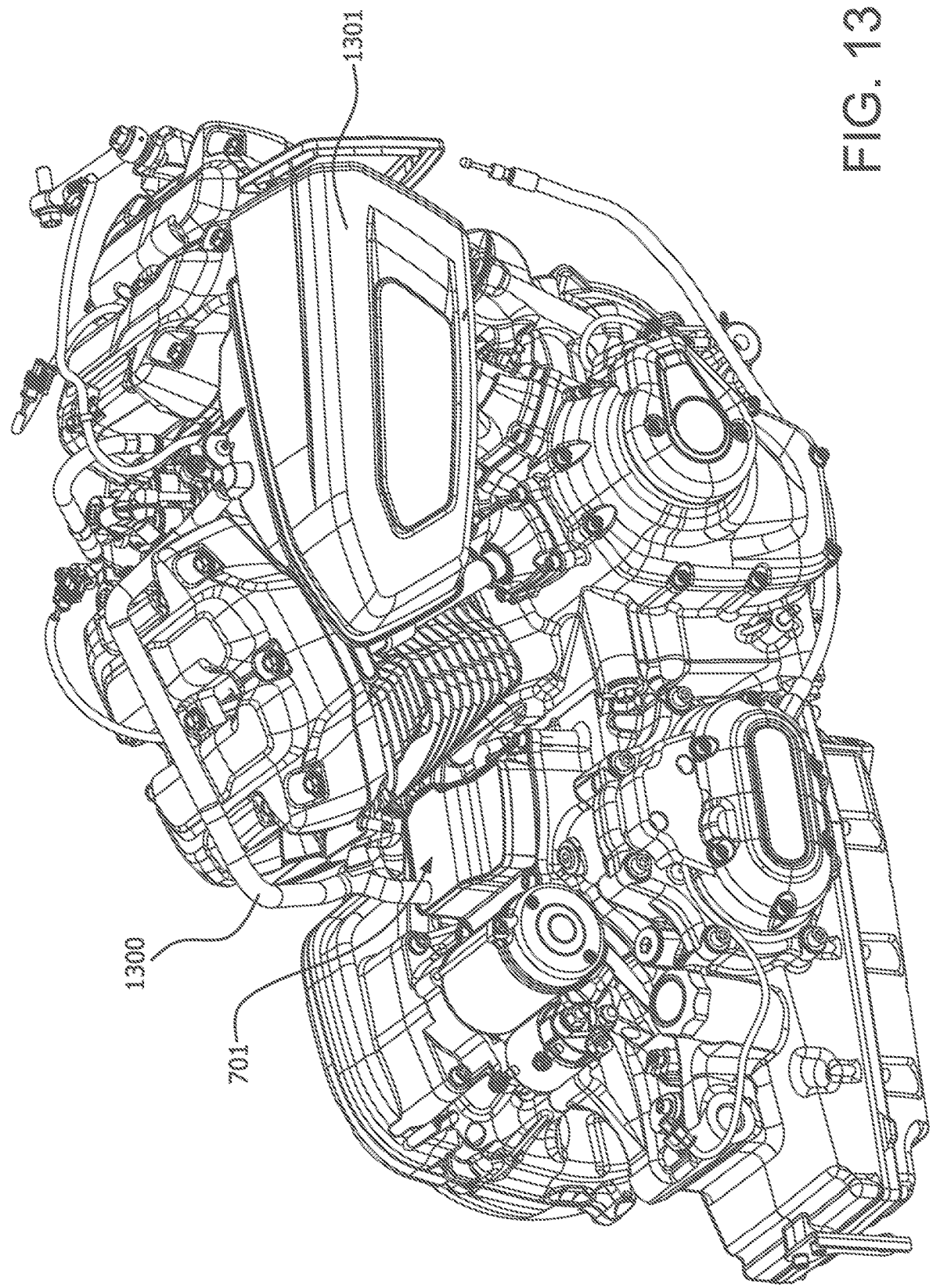
FIG. 13 illustrates a breather assembly and breather hose and surrounding apparatus, in accordance with one or more embodiments set forth, shown, and described herein.

As illustrated in FIG. 13, a breather assembly and breather hose and surrounding apparatus is shown, in accordance with one or more embodiments set forth, shown, and described herein. Shown is breather hose 1300 and airbox 1301. The breather assembly 701 mounts on the transmission case. The crank case gas passes through the breather assembly. The oil separated from the gas in the breather assembly drains back into the cavity under the breather assembly, while the separated crank case gas travels through the breather hose 1300 to the airbox 1301.

Figure 14:
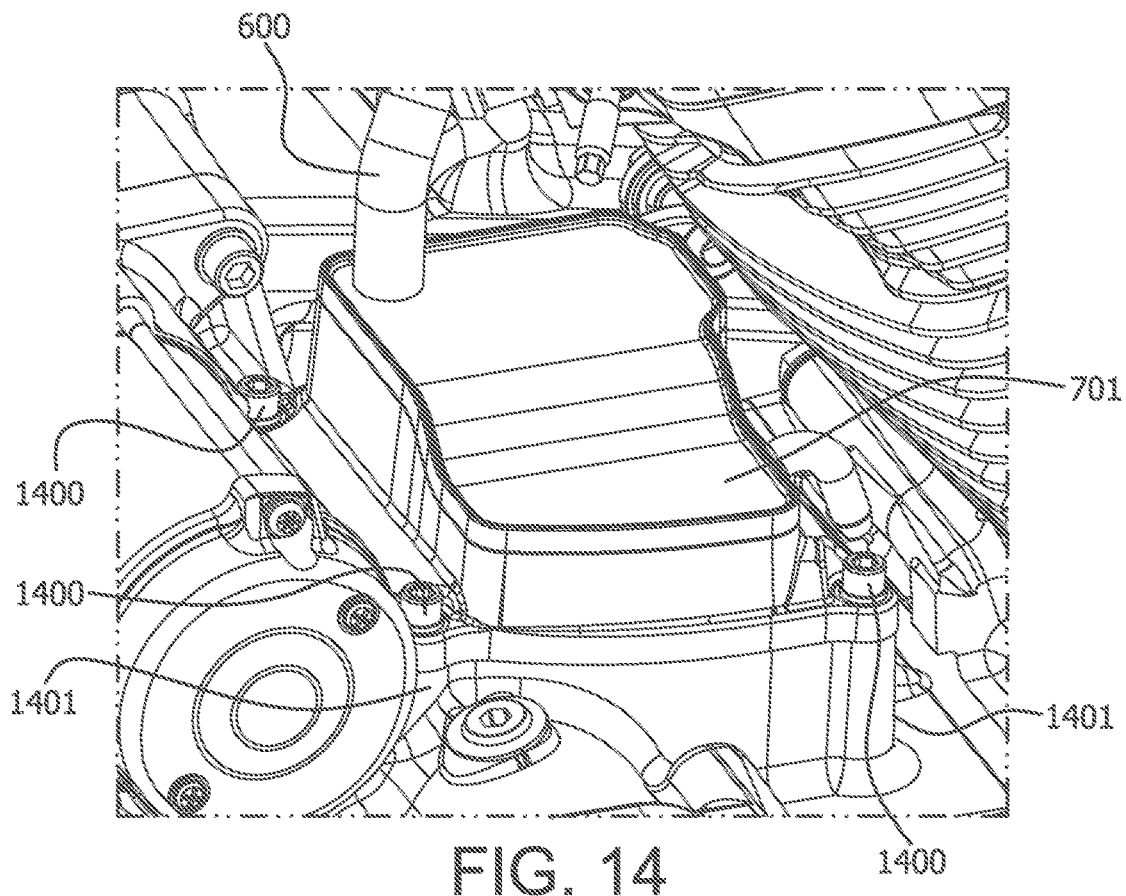
FIGS. 14-16 illustrate a breather assembly installed on a motorcycle, in accordance with one or more embodiments set forth, shown, and described herein.
Figure 15:
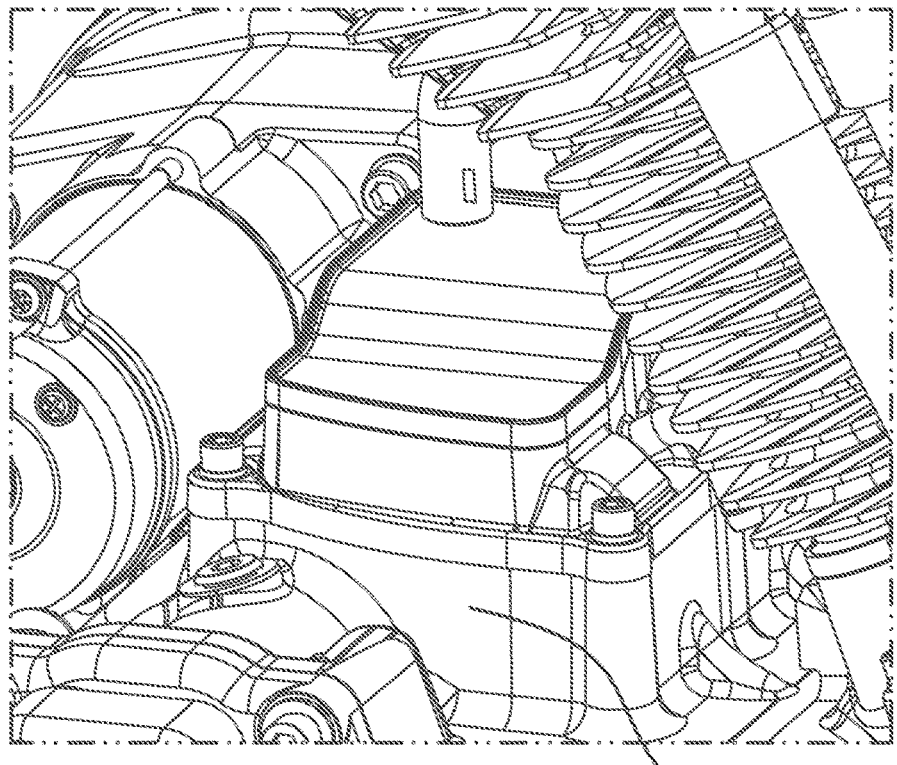
Figure 16:
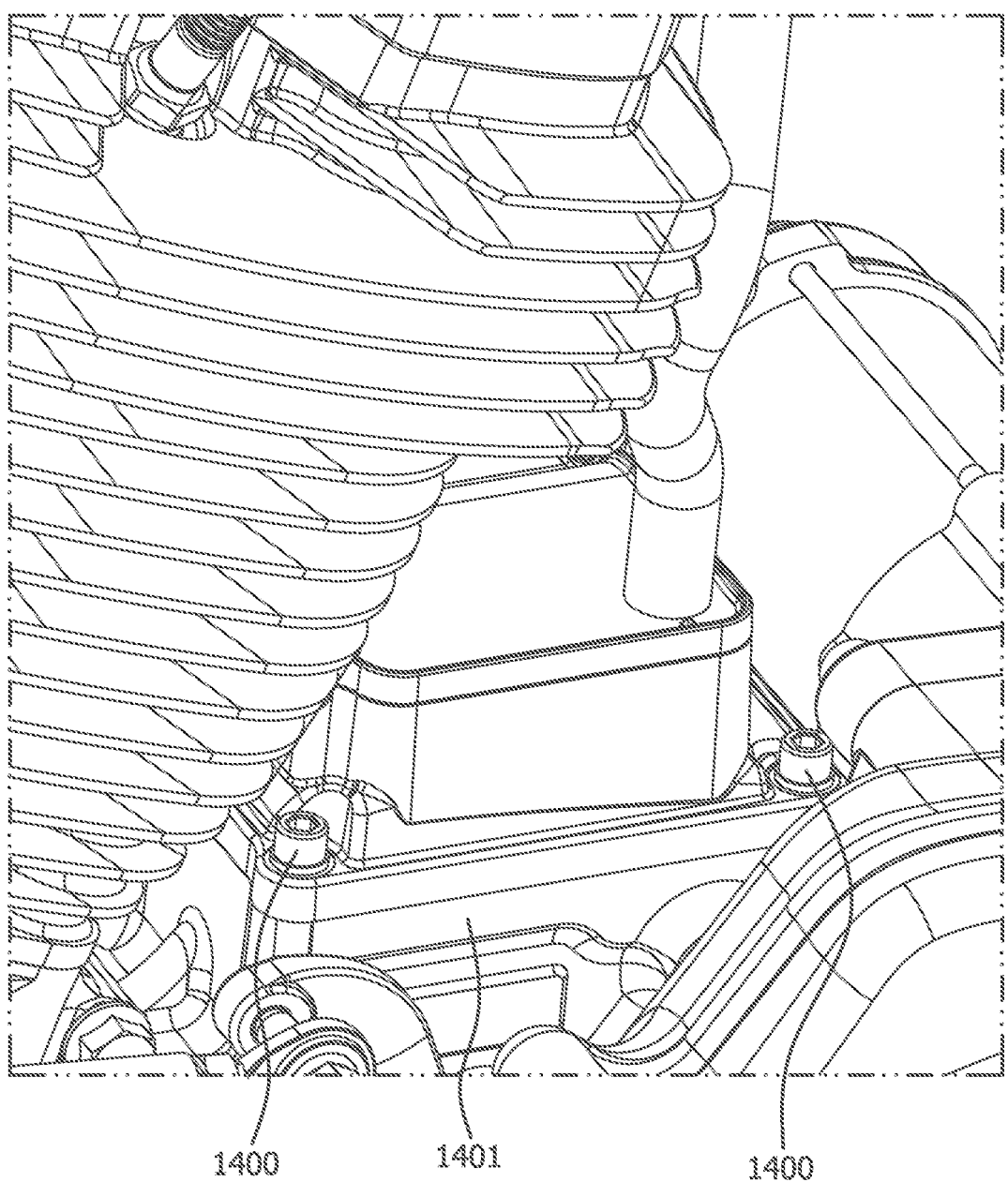

As illustrated in FIGS. 14-16, a breather assembly installed on a motorcycle is shown, in accordance with one or more embodiments set forth, shown, and described herein. The breather assembly 701 uses four fasteners 1400 to attach the breather assembly 701 to a transmission case 1401 or other structure the breather assembly 701 can be mounted on.

Figure 17:
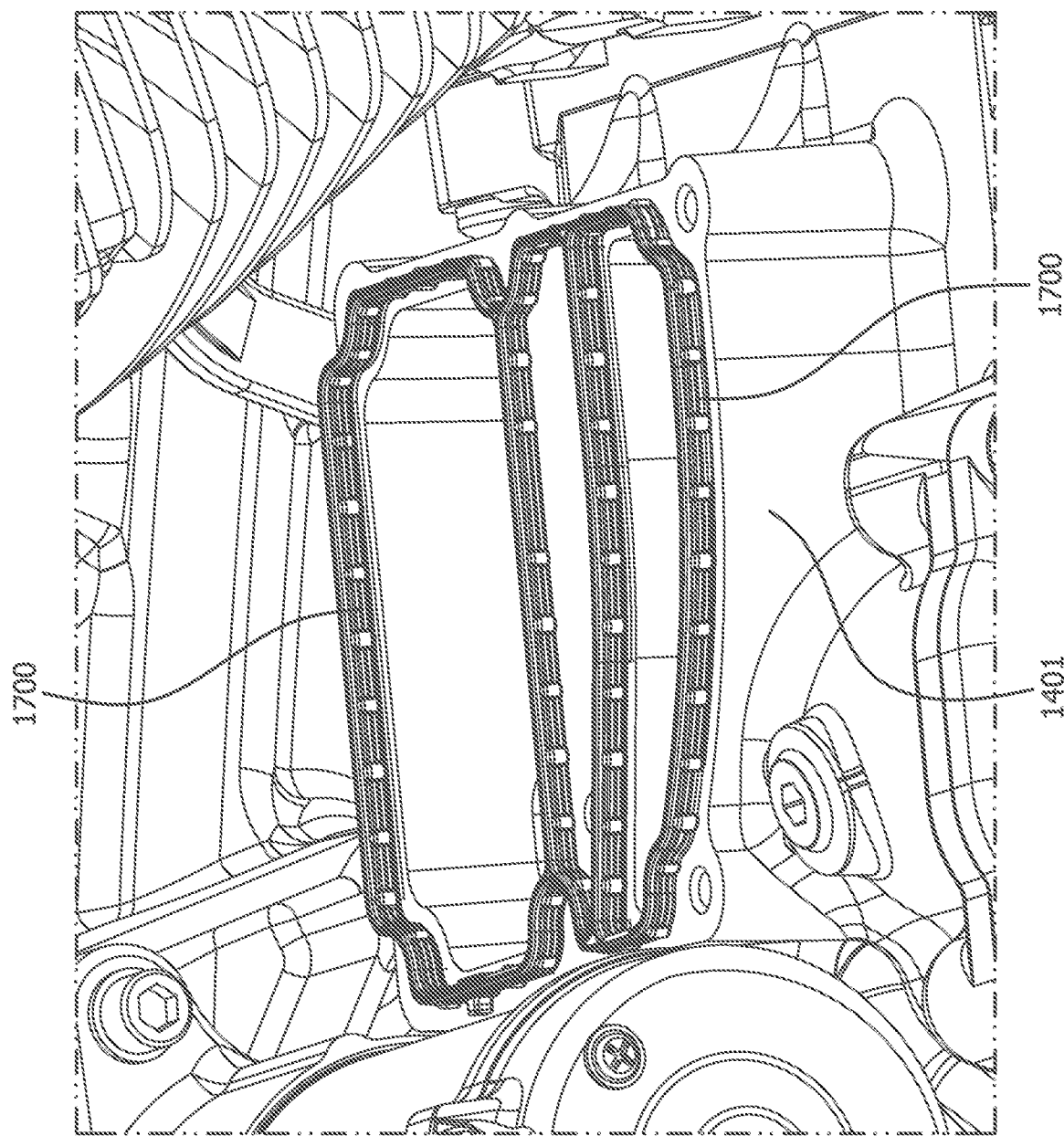
FIG. 17 illustrates a seal for the breather assembly, in accordance with one or more embodiments set forth, shown, and described herein.

As illustrated in FIG. 17, a seal for the breather assembly is shown, in accordance with one or more embodiments set forth, shown, and described herein. The seal 1700 can be a PIP (press in place) seal and is used to seal the breather assembly to the transmission case 1401. The transmission case 1401 (or other mounting structure) has four holes that the fasteners 1400 utilize to secure the breather assembly 701 to the transmission case 1401.

Figure 18:
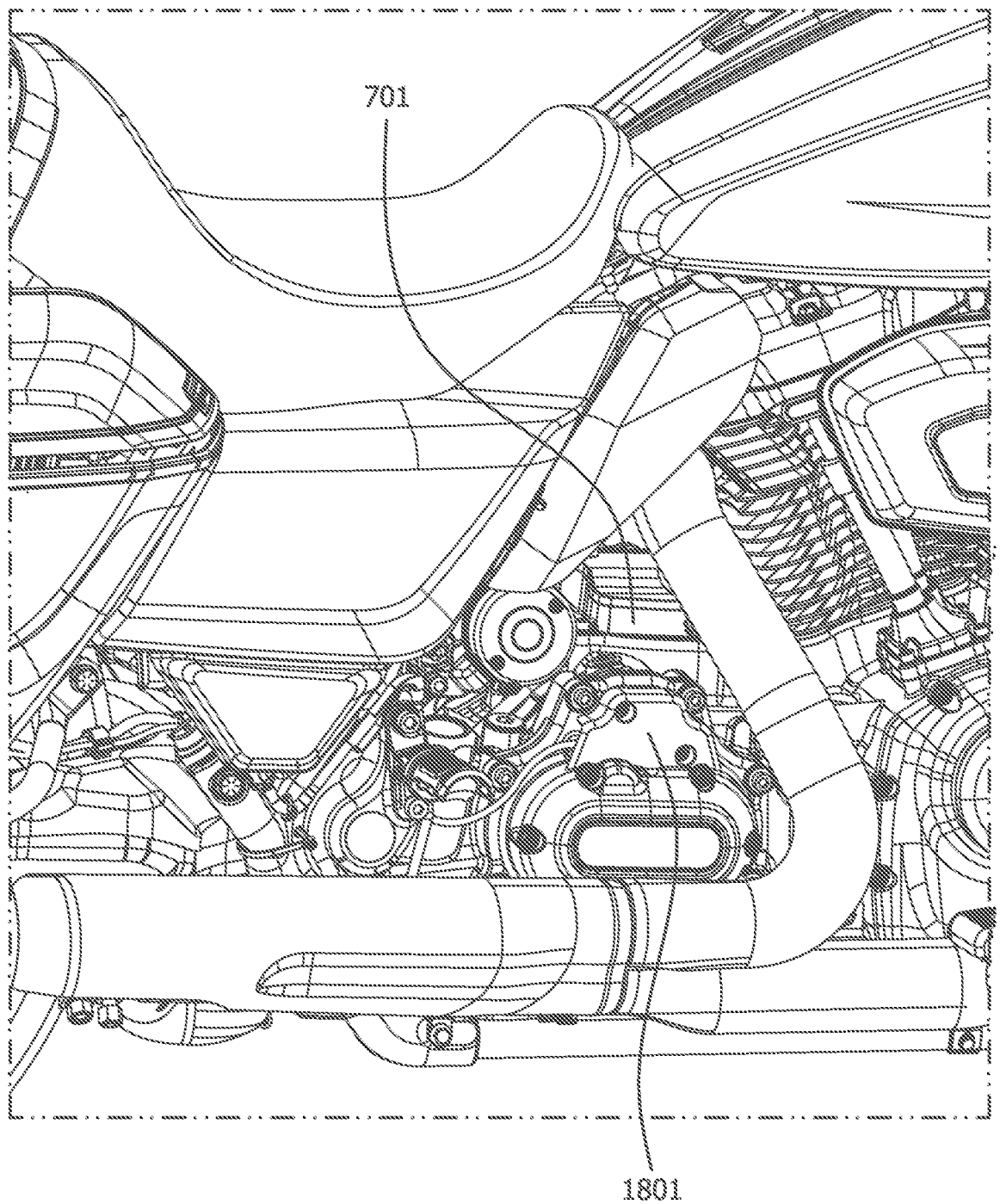
FIGS. 18-19 illustrate an example motorcycle having the breather assembly described herein, in accordance with one or more embodiments set forth, shown and described herein.
Figure 19:
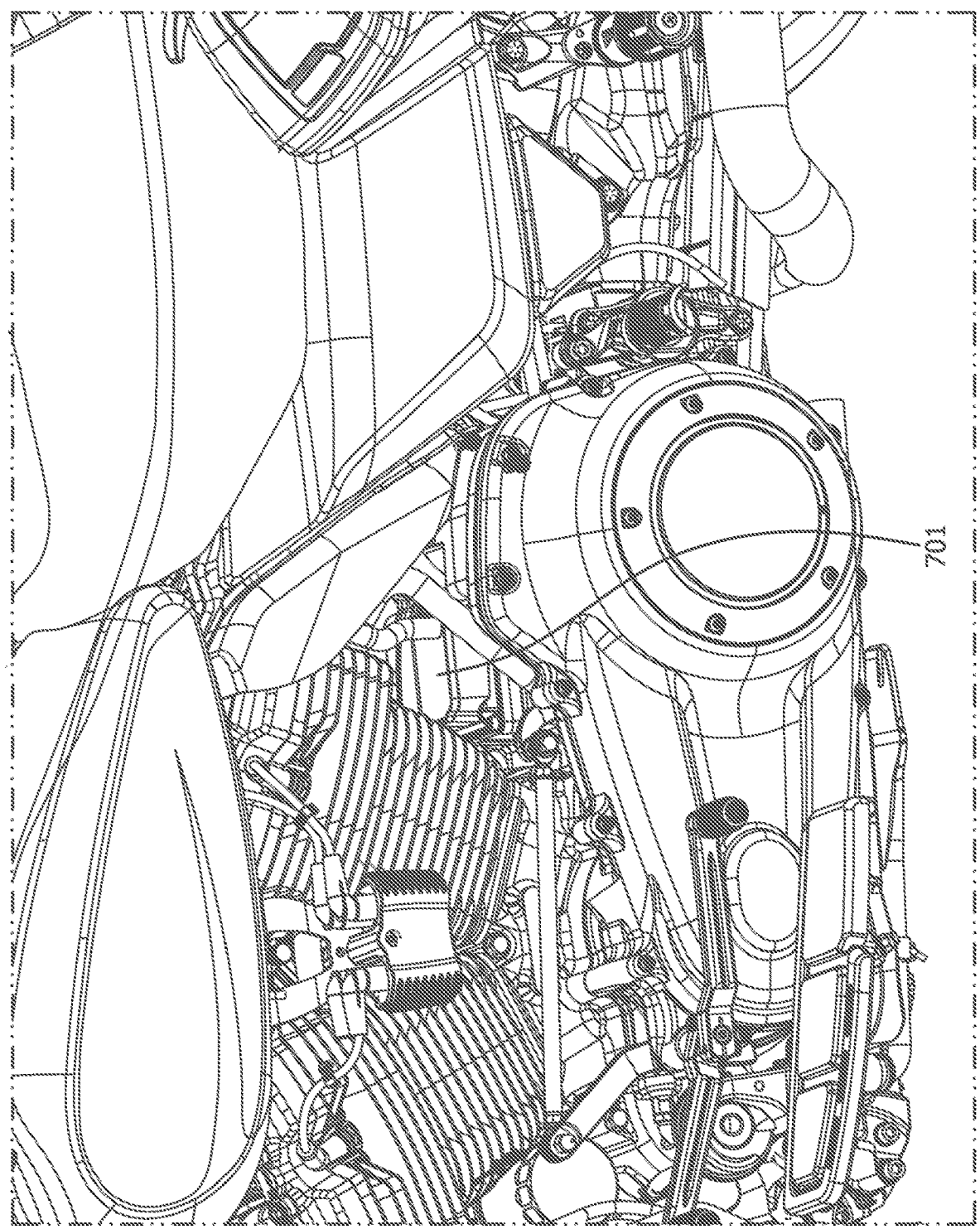

As illustrated in FIGS. 18-19, the breather assembly installed on a motorcycle is shown, in accordance with one or more embodiments set forth, shown and described herein. Note that the breather assembly 701 is over the transmission 1801.

Figure 20:
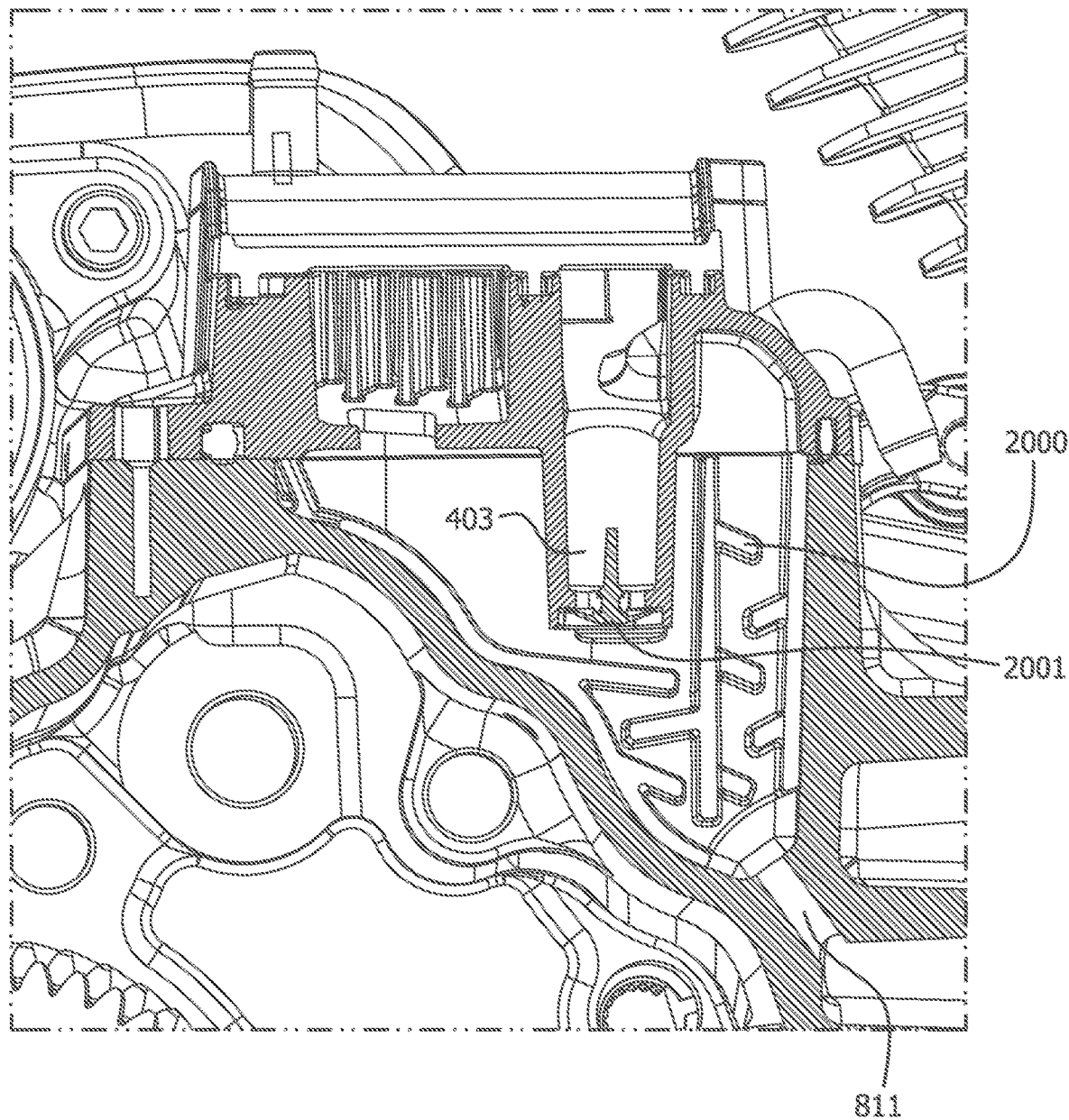
FIG. 20 illustrates a baffle that fits in the cavity under the breather inlet, in accordance with one or more embodiments set forth, shown, and described herein.

FIG. 20 illustrates a baffle that fits in the cavity under the breather inlet, in accordance with one or more embodiments set forth, shown, and described herein.

The baffle 2000 is shown inserted under the breather 701. During hard brake or acceleration events, the baffle slows (damps) the motion of the oil entering the cavity under the breather through passages 810 and 811 from the oil reservoir 804 in order to prevent it from entering the breather inlet. The oil would slow by coming into contact with a set of alternating passages which create a labyrinth or a torturous path, thus requiring the oil to flow back and forth a number of times until it reaches the breather inlet 401.

Figure 21:
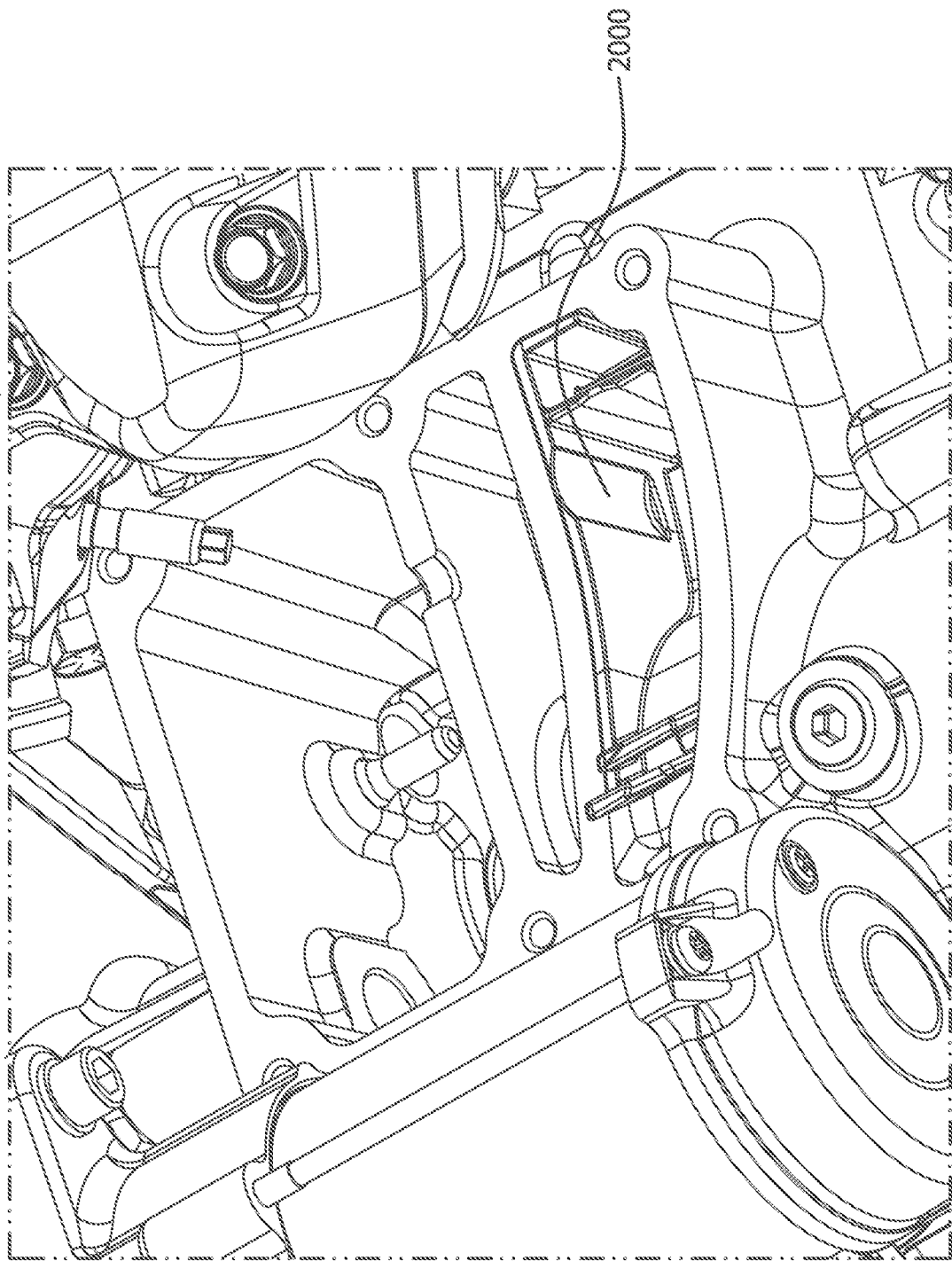
FIG. 21 illustrates a mounted baffle, in accordance with one or more embodiments set forth, shown and described herein.

FIG. 21 illustrates a mounted baffle in accordance with one or more embodiments set forth, shown and described herein. The baffle 2000 is shown mounted in a cavity which would fit under where the breather would be mounted.

Figure 22:
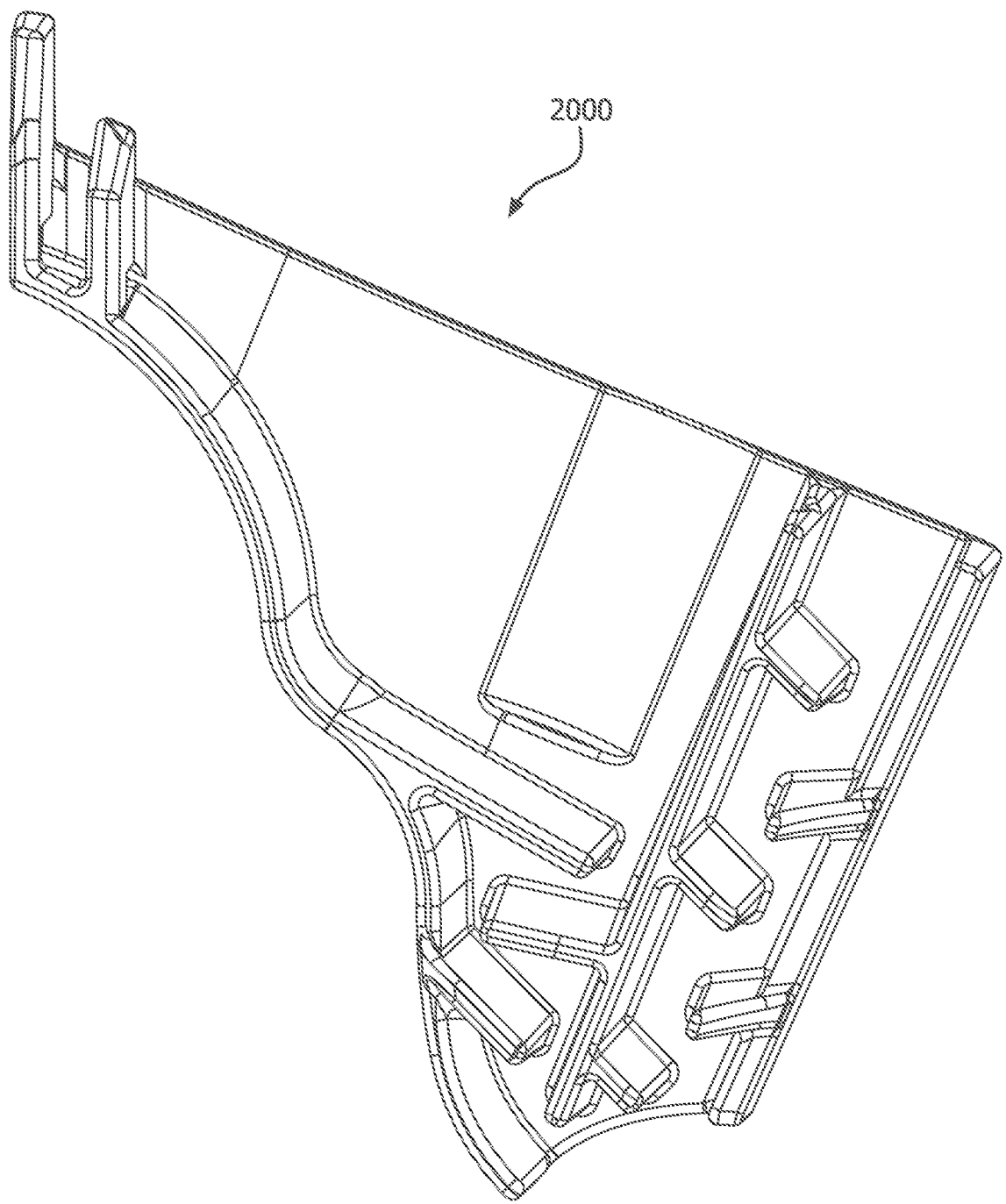
FIG. 22 illustrates an unmounted baffle, in accordance with one or more embodiments set forth, shown, and described herein.

FIG. 22 illustrates an unmounted baffle, in accordance with one or more embodiments set forth, shown, and described herein. The baffle can be made from any hard material, such as hard plastic, etc.

Note that all of the parts described herein can be made from any suitable material for that part, such as plastic (e.g., PVC), hard plastic, metal, aluminum, rubber, stainless steel, etc. All parts can be manufactured using any manufacturing technique, such as injection molding, 3-D printing, casting, machining, etc.

The terms "coupled," "attached," or "connected" may be used herein to refer to any type of relationship, direct or indirect, between the components in query. Those skilled in the art will appreciate from the foregoing description that the broad techniques of the exemplary embodiments may be implemented in a variety of forms. Therefore, while the embodiments have been described in connection with particular examples thereof, the true scope of the embodiments should not be so limited since other modifications will become apparent to the skilled practitioner upon a study of the drawings, specification, and following claims.

What is claimed is:

1. An apparatus, comprising:
   a breather assembly comprising:
   an outlet on a top of the breather assembly;
   an inlet on a bottom of the breather assembly;
   a drain on the bottom of the breather assembly;
   a sloped floor leading to the drain;
   a first passage connecting the inlet to a cam chest; and
   a second passage connecting the inlet to an oil reservoir.

2. The apparatus of claim 1, wherein the breather assembly is configured to separate out oil from vapor entering the inlet.

3. The apparatus of claim 1, further comprising a motorcycle attached to the breather assembly.

4. The apparatus of claim 3, wherein the breather assembly is the only breather attached to the motorcycle.

5. The apparatus of claim 3, wherein the breather assembly is mounted on a transmission case attached to the motorcycle.

6. The apparatus of claim 1, further comprising a baffle connected to the drain.

7. The apparatus of claim 1, further comprising a baffle removably mounted under the inlet for connection to the drain, the baffle comprising a set of alternating passages that prevent flow of oil into the inlet.

8. A motorcycle, comprising:
   a cam chest;
   a transmission case; and
   a breather assembly mounted on the transmission case, the breather assembly including:
   an outlet on a top of the breather assembly;
   an inlet on a bottom of the breather assembly;
   a drain on the bottom of the breather assembly;
   a sloped floor leading to the drain; and
   a first passage connecting the inlet to the cam chest.

9. The motorcycle of claim 8, wherein the breather assembly is the only breather on the motorcycle.

10. The motorcycle of claim 8, further comprising a plurality of fasteners fastening the breather assembly to the transmission case.

11. The motorcycle of claim 8, wherein the breather assembly further comprises a base.

12. The motorcycle of claim 11, wherein the sloped floor makes an angle with the base of 17 degrees.

13. The motorcycle of claim 11, wherein the sloped floor makes an angle with the base in a range of 10 to 30 degrees.

14. The motorcycle of claim 8, further comprising:
   a baffle connected to the drain, the baffle comprising a set of passages.

15. The motorcycle of claim 8, wherein the breather assembly connects to a breather hose which connects to an airbox.

16. The motorcycle of claim 8, further comprising a baffle removably mounted under the inlet for connection to the drain, the baffle comprising a set of alternating passages that prevent flow of oil into the inlet.

17. A motorcycle, comprising:
   a cam chest;
   a transmission; and
   a breather assembly mounted over the transmission, the breather assembly including:
   an outlet on a top of the breather assembly;

an inlet on a bottom of the breather assembly;
a drain on the bottom of the breather assembly;
a sloped floor leading to the drain; and
a passage connecting the inlet to the cam chest.

18. The motorcycle of claim 17, wherein the motorcycle has no other breather other than the breather assembly.

19. The motorcycle of claim 17, further comprising a baffle removably mounted under the inlet for connection to the drain, the baffle comprising a set of alternating passages that prevent flow of oil into the inlet.

\* \* \* \* \*